Sept. 30, 1969        W. R. GOODE        3,469,666
CLUTCH RELEASE BEARING CLEARANCE MONITOR DEVICE
Filed April 1, 1968        2 Sheets-Sheet 1
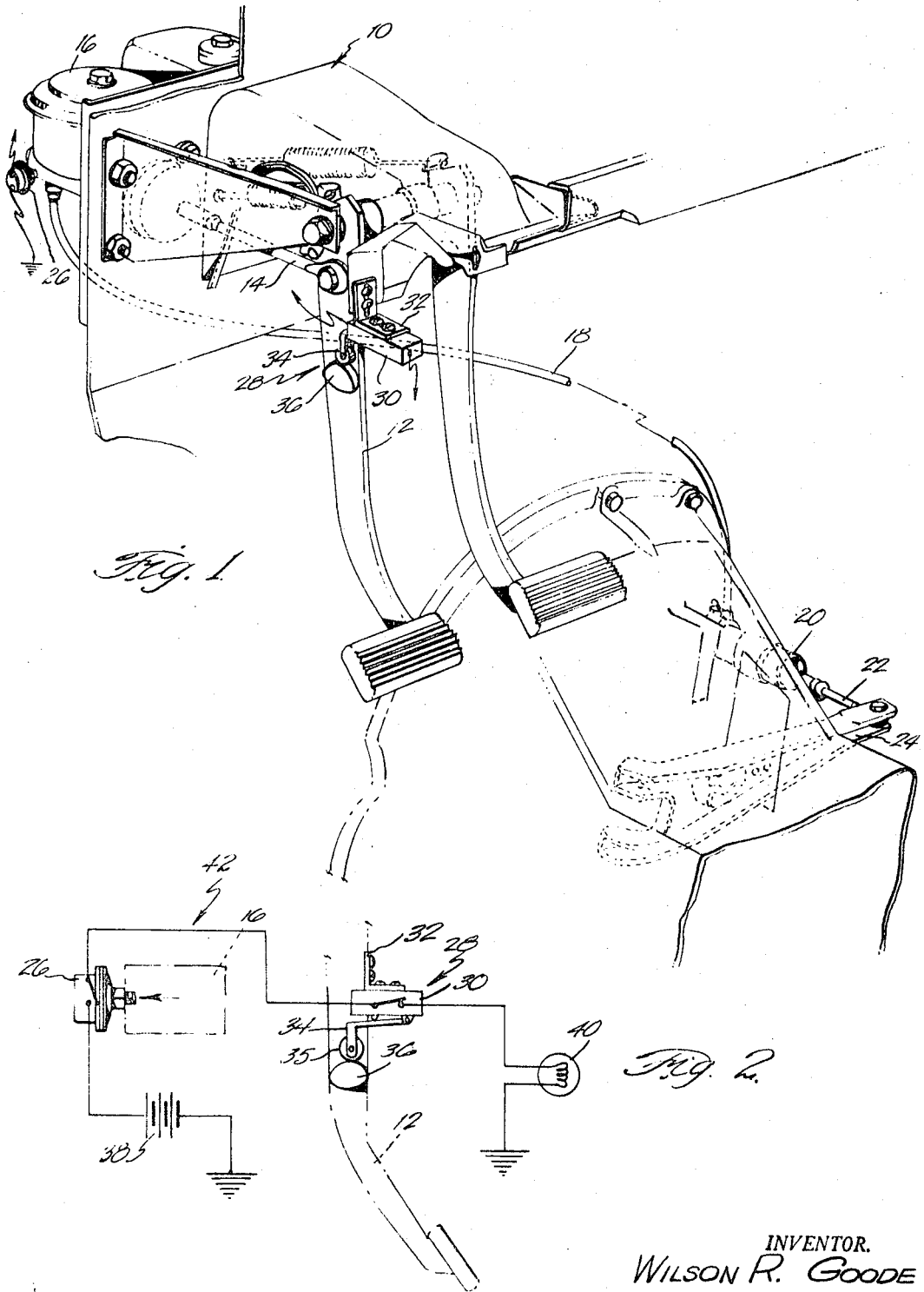
INVENTOR.
WILSON R. GOODE
BY
Lloyd C. Bonstell
HIS ATTORNEY

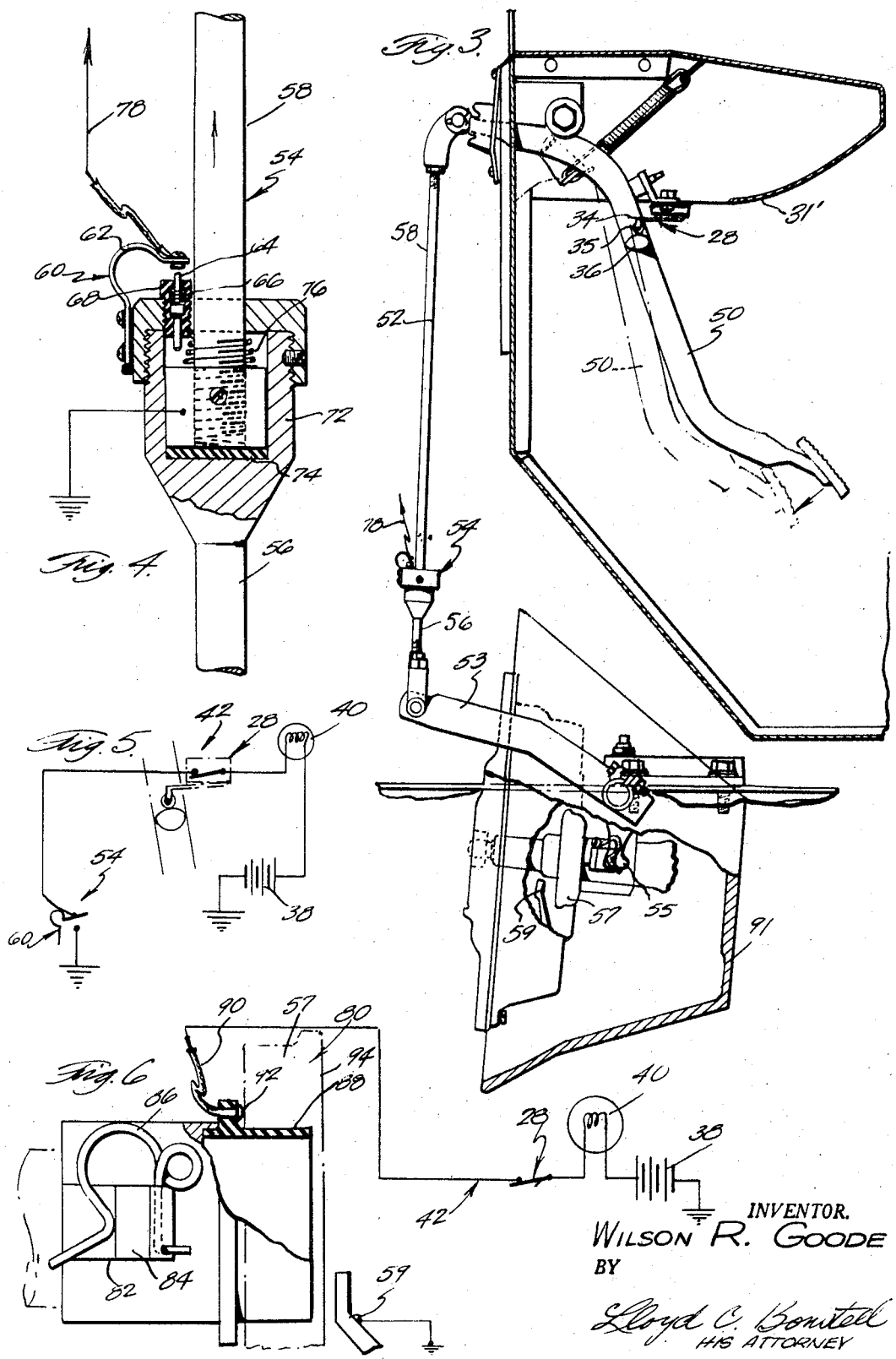

United States Patent Office 3,469,666
Patented Sept. 30, 1969

3,469,666
CLUTCH RELEASE BEARING CLEARANCE MONITOR DEVICE
Wilson R. Goode, 163 B, Rte. 1
Indian Head. Md. 20640
Filed Apr. 1, 1968, Ser. No. 718,022
Int. Cl. F16d *11/00, 23/00, 13/60*
U.S. Cl. 192—30    3 Claims

ABSTRACT OF THE DISCLOSURE

A spring engaged friction clutch which has a release bearing operated by a foot pedal. A first normally closed switch operated by pedal movement is connected in series with a second normally open switch operated by the bearing and an indicator light. Excessive wear of the clutch discs causes the second switch to close so that when the pedal is in normal position, the indicator light is turned on.

---

The present invention relates to clutch systems generally and in particular to a device for automatically monitoring the clearance of the clutch release bearing.

In all clutch mechanisms of the type which employ a release bearing which bears against the levers or fingers on the clutch pressure plate when the clutch is to be released, a tolerance of clearance is required when the clutch is disengaged in order that the bearing be kept from rotation with the pressure plate and subject thereby to damage and wearing out.

The loss of the required clearance results from wear of the face or faces of the clutch plate which permits the clutch pressure plate levers to swing so that their inner ends bear against the release bearing.

The primary object of the present invention is to provide a monitor system to indicate when the clearance between the clutch release bearing and the pressure plate release levers has been lost.

Another object is to provide such an indicating system which is applicable to both mechanically and hydraulically operated clutch release bearings.

A further object is to provide a monitor or indicating system which may be employed with any clutch release system, whether automotive, mobile, or industrial power plants.

A still further object is to provide a clutch release bearing clearance monitor which is simple in structure, foolproof in operation, one economical to manufacture and install on existing equipment or incorporated in new clutch mechanisms with a minimum of expense.

Yet another object is to provide a clutch release bearing clearance monitor which enables the user to detect wear of the clutch plate facing before damage is done to the clutch release bearing so that adjustment may be made to restore the correct tolerance and restore the correct clutch function.

These and other objects of the invention will be apparent from the following description when considered with the annexed drawings in which:

FIGURE 1 is a perspective view of the clutch system of a vehicle showing a first embodiment of the present invention incorporated therein;

FIGURE 2 is a schematic view of the electrical circuit of the form of the invention shown in FIGURE 1;

FIGURE 3 is a fragmentary side elevational view of a second embodiment of the present invention;

FIGURE 4 is an enlarged view partially in section of a portion of the invention shown in FIGURE 3;

FIGURE 5 is a schematic view similar to FIGURE 2, of the form of the invention shown in FIGURES 3 and 4, and FIGURE 6 is a side view partially in section of a portion of a third embodiment of the invention.

Referring in detail to the drawing in which like numerals indicate like parts throughout the several views, in FIGURE 1 the reference numeral 10 indicates a clutch system generally. The system includes a conventional clutch pedal 12 connected by linkage 14 to a clutch master hydraulic cylinder 16.

The master cylinder 16 is connected by a hydraulic line 18 to a clutch slave cylinder 20 of conventional construction. The slave cylinder 20 is operatively connected by linkage 22 to the clutch release fork 24.

The invention provides a pressure sensitive switch 26 of the type commonly employed in connection with a brake system and master cylinder of such a system.

Another switch indicated generally by the numeral 28 is provided by the present invention and is mounted as at 30 on the frame 31 of the vehicle adjacent to an upper portion of the clutch pedal 12 by means of an adjustable bracket 32. The switch 30 has an actuating arm 34 carrying a roller 35 at its free end.

The roller 35 is engageable by a lobe or cam 36 carried by the adjacent portion of the clutch pedal 12.

In FIGURE 2 it will be seen that the electrical circuit includes in series connection the switches 26 and 30, the vehicle battery 38, and an indicator light 40. The circuit is designated generally by the numeral 42.

With reference to FIGURE 3 a clutch pedal 50 is connected by a clutch release rod 52 which is operatively connected to a clutch release lever 53. A switch indicated generally at 28 is carried by the vehicle frame 31 adjacent to the pedal 50 and is of the same construction as the aforementioned switch 28.

The release rod 52 has a lower portion 56 and an upper portion 58 with a switch indicated generally by the numeral 60 incorporated in the adjacent ends of the portions 56 and 58.

The lower end portion 58 is pivotally connected to the free end of a clutch release arm 53 which is operatively connected to the clutch release fork 55. The clutch release bearing 57 moves in response to actuation of the pedal 50 into pressure or thrust engagement with the clutch release levers 59 to disengage the clutch plate. The switch 60 includes a spring contact 62, a plunger 64 biased by a spring 66 and carried by an insulating plug 68 incorporated in the cap 70 of a socket 72.

A cushion element 74 in the closed end of the socket 72 cushions the closing of the switch in which there is a spring 76 biasing the electrical contact 78 to "switch open" position.

With reference to FIGURE 6 a third embodiment of the invention comprises a switch indicated generally at 80 and includes a sleeve 82 having thrust lugs 84 which receive the clutch release fork 55. Retainer clips 86 of conventional construction secure the fork 55 to the sleeve 82.

The present invention provides an insulating cylinder or hub 88 carried by the sleeve 82 and forming a support for the clutch release bearing 94. A wire 90 extending into the clutch housing 91 has its free end terminating in a contact 93 secured in the hub 88 and electrically engaged by the adjacent face of the inner race of the clutch release bearing 94.

The wire 90 is in circuit with the aforementioned pedal switch 28, the indicator light 40, and the vehicle battery 38 in the system as shown at 42 in FIGURE 2. It will be seen that upon wear of the clutch plate the pressure plate fingers will electrically contact the adjacent face of the bearing 94 to complete the electrical circuit when the pedal switch 28 is in closed position.

In operation, the switch 28 is normally closed only when the pedal 12 is not depressed and it stays closed for the period of travel of the pedal 12 through the adjustable distance of free travel, as is conventionally arranged in all pedal operated clutch systems.

Upon wear of the clutch plate the pressure plate levers engage the release bearing, in each of the embodiments of the invention, and in the first embodiment pressure is built up in the slave cylinder and in the master cylinder upon movement of the pedal and before the pedal has completed its free travel movement. This results in closing of the circuit through both of the switches and energizing of the indicator lamp.

Similarly in the second embodiment the switch contacts 62 and 64 close upon application of pressure to the clutch pedal and before completion of the free travel movement of the pedal, due to the movement of the levers into engagement or to loss of the release bearing clearance. This loss of release bearing clearance results in the compression of the release rod portions 56 and 58 closing the switch 60 before the pedal 50 has completed its free travel movement, with the result that the circuit is closed and the indicator light energized. While it is illustrated that the clutch release rod 52 moves downwardly to effect actuation of the clutch release bearing, it is to be understood that elements of the switch 60 may be rearranged in a clutch release rod which pulls upwardly to effect disengagement of the clutch.

In the third embodiment, movement of the release levers into engagement with the adjacent bearing face completes the circuit, with the pedal switch in closed position when in inoperative position and before completion of the free travel movement.

It will be seen therefore that the free travel movement of the pedal may be adjusted to keep the adjacent pedal switch in normally closed position for the length of movement of the pedal to effect thrust or pressure and resultant movement of the release bearing to close the gap with the release levers. If the clutch plate is worn the gap will be such that the associated switch will close before the pedal switch opens, completing the circuit and energizing the indicator light.

What is claimed is:

1. In a clutch system including a clutch pedal having free travel movement and a clutch release bearing operatively connected thereto for movement of said bearing toward and into thrust engagement with clutch release levers carried by a clutch pressure plate upon execution of movement by said pedal, a first normally closed switch means engageable by said pedal and operable to open upon completion of the free travel movement of said pedal, a second normally open switch means operatively connected to said release bearing and operable to close upon thrust engagement of said bearing with the clutch release levers, and an indicator light in series connection with said first and second switch means and with a source of electrical energy.

2. The apparatus as set forth in claim 1 in which said second switch means is a hydraulic sensitive pressure switch.

3. The apparatus as set forth in claim 1 in which said second switch means comprises an electrically insulated bearing mounted for electrical engagement with the clutch release levers.

References Cited

UNITED STATES PATENTS

| | | |
|---|---|---|
| 2,323,489 | 7/1943 | Schmidt et al. |
| 3,406,800 | 10/1968 | Buchanan et al. |

BENJAMIN W. WYCHE III, Primary Examiner

U.S. Cl. X.R.

340—52; 192—110